United States Patent Office 3,386,953
Patented June 4, 1968

3,386,953
LATENT CURING OF EPOXY RESINS
Herbert Neal Dunning, St. Paul, and John R. Nazy and
Harold Wittcoff, Minneapolis, Minn., assignors to General Mills, Inc., a corporation of Delaware
No Drawing. Filed Aug. 26, 1963, Ser. No. 304,658
24 Claims. (Cl. 260—47)

ABSTRACT OF THE DISCLOSURE

This relates to the curing of epoxy resins by the use of a latent curing agent that is a Schiff's base formed by reaction of (a) carbonyl compound and an adduct of (c) a fatty aliphatic polyamine and (b) a mono-epoxy compound.

---

The instant invention relates to epoxy resins and, more particularly, to latent curing of epoxy resins and new and improved agents and methods for effecting latent curing of such epoxy resins and the resulting infusible, insoluble epoxy resins.

Although the instant invention is concerned primarily with the use of epoxy resins, the instant invention also relates to new latent curing agents for such epoxy resins, which may have other uses, but which will be described herein primarily in connection with the latent curing use.

Epoxy resins have been known and used commercially for some time, and these resins have been described in substantial detail in numerous publications and patents. For example, epoxy resins are described in substantial detail in such recently issued United States patents as Nos. 2,923,696; 3,026,285; 3,067,170; 3,072,606; 3,072,607; 3,073,799; 3,079,367; 3,080,341; and 3,084,139, each of which patents is included herein by reference as disclosing typical epoxy resins which are used in the practice of the instant invention.

The epoxy resins are known to produce a number of valuable products, and particularly in the coating arts, the epoxy resins are known to produce infusible, insoluble coatings or films which when properly cured exhibit desirable properties such as toughness, thermal stability, and the like. The curing agents for such epoxy resins, however, have been found to leave something to be desired. Some of such curing agents react too rapidly and thus have such a short "pot life" that the handling of the epoxy resins prior to curing is considerably complicated; and in the case of other curing agents, such agents tend to cure the compositions with objectionable results which include undesirably slow curing, low impact resistance in the cured resin and/or brittleness in the cured resin. The so-called "pot life" is important in that it represents the time that is allowed for the handling of the resin after the incorporation of the curing agent and before curing to such an extent that the resin can no longer be filmed, coated or otherwise manipulated in the manner desired prior to curing. On the other hand, only a reasonable length of "pot life" is desired, since it is important that the epoxy resinous composition ultimately cure to obtain good toughness and a relatively "tack-free" surface characteristic. The ultimate curing time is preferably a reasonably short curing time in the presence of ambient atmosphere, after the desired filming or similar manipulation of the composition has been effected.

The fundamental chemistry of epoxy resins is comparatively simple. The epoxy resins are understood to contain the characteristic functional epoxy group, i.e.

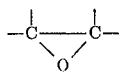

which characteristic functional group is understood to undergo cross-linking via primary amine groups, i.e., —NH₂, in accordance with the following general Equation A:

(A) 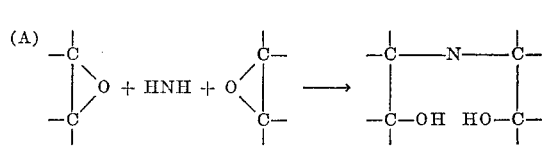

The use of simple primary amines, as cross-linkers, ordinarily results in far too short a "pot life," among other undesirable results.

The prior workers in the art have suggested other cross-linking agents, as indicated in the previously mentioned patents, and specifically in U.S. Patent No. 3,026,285 mention is made of the use of a complex of a primary amine and an aldehyde, which complex is known in chemistry as a Schiff's base, which is generally understood to be formed by the reaction of a primary amine and a carbonyl compound such as an aldehyde or ketone, in accordance with the following Equation B:

(B) 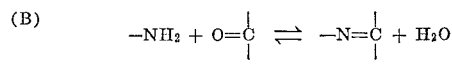

The foregoing reaction of Equation B is, of course, reversible, and the Schiff's base will thus react in the presence of moisture to produce the primary amine again. The initial reaction to form the Schiff's base is carried out under conditions effecting the removal of water. Specific mention of Schiff's base is also made in the aforesaid U.S. Patent No. 3,072,606, although the mention is made for use in connection with certain Friedel-Crafts catalysts.

The azomethine linkage of the Schiff's base is apparently suitable for use in a latent epoxy curing agent, in that it will release the primary amine in a film or otherwise formed composition of an epoxy resin, upon adequate exposure to water or the moisture of ambient atmosphere. The instant invention, however, relates to the discovery of a Schiff's base which has an unusual combination of properties, as a latent epoxy curing agent.

The Schiff's base that is used in the practice of the instant invention has the advantage of being compatible with epoxy resin composition to form compositions having the desired prolonged pot life, but to form compositions which have a relatively short tack-free time once applied in film or other desired form for curing, upon exposure to ambient moist atmosphere. Addition of water to the formulation will of course accelerate the cure, but this procedure limits the uses of the composition by decreasing the pot life. The instant Schiff's bases afford other advantages, in addition to compatibility and latent curing effects, in that they afford a faster cure (i.e. shorter tack-free time) to obtain films having superior smoothness, clarity, hardness and toughness. These various superior properties are believed to result from the desirable aspects of compatibility that are obtained using the specific Schiff's bases described herein.

It is, therefore, an important object of the instant invention to provide an improved latent epoxy curing agent, an improved hardenable epoxy resin composition, an improved method of preparing a hardenable epoxy resin composition, an improved method of preparing an infusible, insoluble epoxy resin product, and the resulting improved infusible, in soluble product in film or other form.

Other and further objects, features and advantages of the present invention will become apparent to those skilled in the art from the following detailed disclosure thereof, including the examples hereof.

In general, the instant invention consists in a new substance or material that is a Schiff's base formed from an adduct of (c) 3 to 4 mols of an aliphatic amine having the formula:

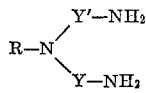

wherein R is an aliphatic $C_8$-$C_{22}$ fatty hydrocarbon chain and Y and Y' are each $C_3$-$C_4$ alkylene groups, with (b) 3 to 4 mols of a mono-epoxy compound; and the instant invention further consists in a new composition containing such Schiff's base, as well as new and improved methods of preparing such compositions and converting the same to infusible, insoluble resinous products, and the resulting infusible product per se.

Although it is not desired to limit the invention to any particular theory, it is believed that in the preparation of the Schiff's base employed in the practice of the instant invention, using certain preferred starting materials, as an example, it is possible to obtain a Schiff's base "composition" which contains a mixture of a number of different complexes or chemical compounds, merely by selection of the approximate molar ratios that are employed in the preparation of the instant Schiff's base composition. Typical of the compounds that may be used in the practice of the instant invention are the following compounds believed to have the following theoretical structural formulas:

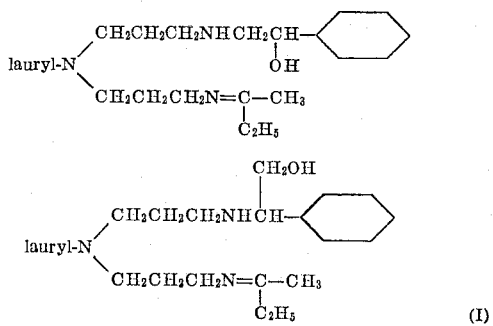

These two structures result from the reaction of styrene oxide with the aliphatic amine starting material and the particular compound formed depends on the manner of addition of the styrene oxide. From theoretical considerations it is believed that the

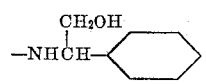

structure predominates, but the

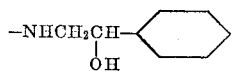

structure may also be preesnt. For simplicity sake, the structure

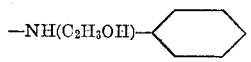

will be used herein to cover both possible structures.

The reaction route for the preparation of the above compound (I) is understood to involve the following theoretical equation sequence (C), which involves first forming an adduct (IV) of bis-(aminopropyl) laurylamine (II) and an equimolar proportion of styrene oxide (III) and then reacting the remaining primary amine groups of such adduct (IV) with methyl ethyl ketone (V) to obtain the Schiff's base (I), as follows:

(C) Reaction Route for Typical Preferred Schiff's Base of Invention

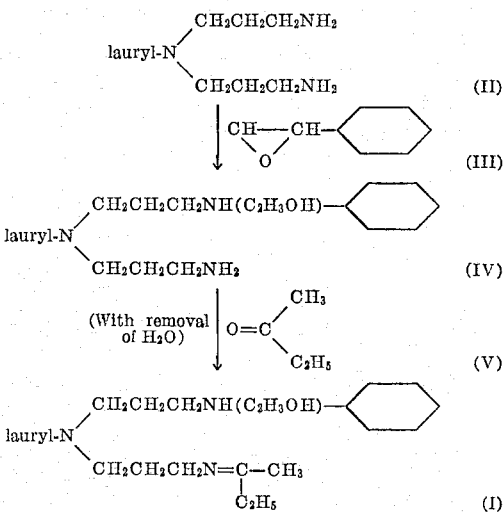

EXAMPLE 1

In a two liter flask, there is placed a charge of 553.5 grams (1.85 mols) of bis-(aminopropyl) laurylamine and 222 grams (1.85 mols) of redistilled styrene oxide. This reaction mixture is allowed to stand at ambient temperature for six days during which time the base content (titrated with HBr in acetic acid) dropped from 9.3 meq. per gram to 6.8 meq. per gram. One hour of heating at 100° C. does not lower the base content further, thus indicating that the reaction is already complete.

To the product or adduct (IV) obtained in the previous paragraph is added a charge of 644 grams (8.9 mols) of redistilled methyl ethyl ketone, and this reaction mixture is then distilled through a 12 x ¾ inch Vigreux column fitted with a reflux condenser and a Dean-Stark trap. The initial boiling point is about 76° C. and 400 milliliters of distillate, boiling from 77° C. to 78° C. is collected. The residue is filtered and vacuum stripped at 80° C., to give a yield of 862 grams (98.6%) of clear, yellow liquid Schiff's base (I).

Epoxy resin composition

Using a commercially available liquid epoxy resin identified as GX190 (which is a bisphenol A-epichlorohydrin epoxy resin having an equivalent weight of 190) with about two-thirds the weight thereof of the above identified Schiff's base (I) one obtains a substantially homogeneous composition after about two hours of mixing. The use of a small amount of solvent eliminates this time lag. Films made from the resulting homogeneous mixture are found to cure in about one day to give a tough, hard, glossy coating of superior properties.

More specifically, a coating composition is prepared by thoroughly mixing 60 grams of the aforesaid GX190 liquid epoxy resin with 40 grams of the aforesaid Schiff's base (I), with a small amount of solvent to aid in dispersion of the materials (i.e. 6 grams of Cellosolve and 1 gram of Dow-Corning 840 silicone, which is understood to be a dimethyl polysiloxane liquid silicone). The mixture becomes substantially homogeneous rather rapidly because of the Cellosolve, but mixing is continued for a period of two hours to obtain a homogeneous mix having a viscosity (Gardner-Holdt) of U, and a pot life (brushing) of about five hours which is excellent for most uses. The homogeneous composition is filmed on tin panels with a conventional film applicator at thicknesses of 1½, 3, 5 and 10 mils. The 1½, 3 and 10 mil coatings are cured at 73° F. and 50% relative humidity, while the 5 mil coatings on separate panels are cured at 73° F. and 34% and 85% relative humidity. It is found that tack-free films are obtained even in the case of the thicker 10 mil films within one day, and the resulting films have excellent glossy appearance, and hardness (which improves somewhat on the second and again on the third day), and impact-flexibility (which also improves somewhat from the first to the third day). The films are also found to exhibit accelerated cure if a small amount of moisture is added thereto at approximately the time of filming. The resulting cured films (after one day) are also found to have excellent resistance to water and mineral spirits.

Comparisons made with commercially available curing agents using the same type procedure demonstrate that the hardness and impact-flexibility results obtained in the practice of the invention in accordance with the description of the previous paragraph are not approximated using curing agents commercially available which have a pot life of more than approximately about ½ hour. It will be appreciated that even though superior results may be obtained using a curing agent which affords a pot life of only about ½ hour, the very short pot life time limits the overall utility of the composition. In contrast, the five hour pot life that is obtained in the practice of the invention, as described in this example, affords a number of substantial advantages in the uses of the compositions.

In general, the Schiff's base (I) is used in an amount ideally sufficient to provide about one primary amino group for two epoxy groups in the resin, in accordance with the general theory of the cross-linking reaction hereinbefore mentioned; but in actual practice such factors as steric hindrance and the like preclude complete reaction of every epoxy group and every primary amino group in many cases. The weight ratios preferred for use in the practice of the instant invention on the basis of (1) epoxy resin to (2) Schiff's base may range from about 7:3 to about 1:1, and as indicated about 3:2 is a preferred ratio. It will be appreciated that the relative proportions of (1):(2) relate to the hardenable components of the composition and suitable conventional additives such as the pigments, fillers, etc. may be incorporated in the compositions. In addition, curing conditions can be varied to suit a particular need, e.g., by increasing or decreasing the temperature and/or relative humidity.

One aspect of the Schiff's bases used in the invention is that they have a long aliphatic chain which is believed to contribute to the compatibility and other desirable features of the invention. One of the starting materials, sometimes referred to herein as (c), thus used in the practice of the invention is an aliphatic polyamine having the formula:

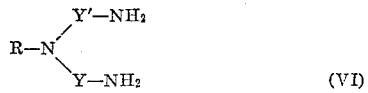

(VI)

wherein Y and Y' are each $C_3-C_4$ alkylene groups and R is an aliphatic $C_8-C_{22}$ hydrocarbon group (i.e. containing from 8 to 22 carbon atoms) such as octyl, nonyl, decyl, undecyl, dodecyl (lauryl), etc. Preferably, the R group will be derived from the naturally occurring fatty acids such as oleic, lauric, linoleic, and the like, or mixtures thereof found in the fatty oils such as tallow oil, coconut oil, and the like. Where R is derived from a mixture of acids, such as tallow oil acids, R is defined in the usual manner by the source of the acids, such as tallow, coco, etc.

These compounds may be prepared in the conventional manner by a two-step process consisting of the preparation of the diadduct of acrylonitrile (or substituted acrylonitrile such as methacrylonitrile or crotonic nitrile) with a primary aliphatic amine in which the aliphatic group has from 12 to 22 carbon atoms followed by subsequent hydrogenation of the dinitrile product to the amine product.

The principal means of preparing the diadducts of acrylonitrile and the primary aliphatic amines consists in reacting an excess of acrylonitrile (two to ten times the theoretical amount) with the aliphatic amine in the presence of an acid catalyst within the temperature range of 60–100° C. In general, the relatively strong acids, such as acetic acid and phosphoric acid, are used in the dicyanoethylation process. In addition to the acidic catalysts, other non-acid catalysts may also be employed. The time of reaction depends largely on the particular catalysts used and the proportions thereof. In general, the time of reaction will be from seven to forty hours.

The polyamines of this invention are then obtained by the hydrogenation of the dinitriles. Any conventional hydrogenation technique may be employed which will reduce the nitrile groups. In general, the reduction is carried out in the presence of a catalyst, such as palladium or nickel, and in the presence of ammonia under superatmospheric conditions and at temperatures less than 100° C., in the range of 70–100° C., under pressure of hydrogen on the order of 700–1500 pounds per square inch gauge. In general, about two mols of ammonia per mol of tertiary amine is employed. When using wet Raney nickel as a catalyst, the catalyst is used generally in an amount of about 10% by weight based on the amount of dinitrile.

The preparation of the acrylonitrile diadduct can best be illustrated by means of the following procedure:

Ten equivalents of commercial distilled dodecyl amine (1970 grams), methanol (197 grams), 2.7 equivalents of acrylonitrile (1448 grams) and glacial acetic acid (39.4 grams) was stirred and heated under reflux for two and one-half hours. The stirrer was then stopped and the reaction allowed to stand at 47° C. for a total of 40 hours. The excess acrylonitrile, methanol and possibly some acetic acid were removed by heating the reaction product to 105° under a vacuum of 25 mm. The yield was 2990 grams (theory=3030 grams). As the diadduct is the tertiary amine present in the reaction mixture, the percent of diadduct present was determined by direct titration of the tertiary nitrogen atom. The tertiary amine content was 86%.

In a similar manner, the acrylonitrile, methacrylonitrile and/or crotonic nitrile diadduct may be formed from tallow amine, oleyl amine and similar fatty amines in which the fatty radical contains from 12 to 22 carbon atoms. The acrylonitrile diadduct of fatty amine can then be hydrogenated as indicated hereinbefore.

EXAMPLE 2

In a one liter flask, there is placed a charge of 299 grams of bis-(aminopropyl) laurylamine and 150 grams of phenyl glycidyl ether (i.e. about 1 mol each). The reaction mixture becomes warm to the touch on standing at ambient (room) temperature. Titration with HBr in acetic acid showed that after one day, the base content was 6.57 meq. per gram, which indicates that the reaction is complete.

Using the equipment described in the second paragraph of Example 1, a charge of 348 grams (4.83 mols) of methyl ethyl ketone is added to the product of the previous paragraph and the reaction mixture is distilled in the manner previously described until the distillate vapor temperature started to increase; excess ketone is then removed and the residue is vacuum stripped at 80° C. (and 2 mm. Hg) to obtain 381 grams of a clear yellow liquid product, which is understood to have the following formula:

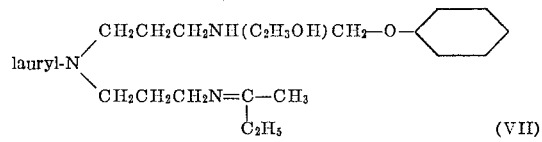

(VII)

Epoxy resin composition

Using the previously described epoxy resin GX190, it is found that the above Schiff's base (VII) is apparently very readily compatible, immediately giving a clear mixture in a 1:1 weight ratio mix. The resulting epoxy resin mix was found to have a pot life of approximately one day. A 3 mil film made in accordance with the previously described procedure was found to demonstrate a tack-free time of less than one day and the resulting film was a clear, hard and tough film having the desired properties of the invention.

Another of the starting materials, sometimes referred to as (b), used in the practice of the invention is a (mono-) epoxy compound preferably having the following theoretical structural formula:

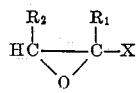

(VIII)

wherein $R_1$ and $R_2$ are each H or a lower ($C_1$–$C_4$) alkyl group and X is preferably an aromatic radical. The epoxy compound (VIII) is capable of undergoing reaction with the aliphatic amine (VI) in a manner similar to reaction (C).

A "mono-adduct" (IX) is obtained using equimolar proportions. In the practice of the invention, however, the mol ratios of (b):(c) preferred are about 4:3 to about 3:4 so there is believed to be some, although comparatively little, formation of "di-adduct" (IXA) particularly when some excess of compound (VIII) over the preferred equimolar proportion is used.

Typical examples of the preferred epoxy compounds (b) are styrene oxide:

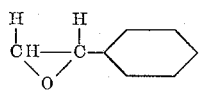

(III)

alpha-methyl styrene oxide:

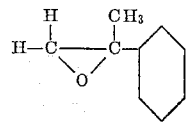

(IIIA)

o-, m- or p-methyl styrene oxides, and related compounds:

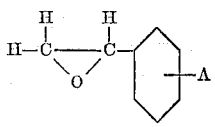

(IIIB)

wherein A signifies methyl, or typically inert lower ($C_1$–$C_4$) alkyl or alkoxyl group; or compounds wherein the epoxy group and the aromatic nucleus are connected by typically inert ($C_1$–$C_4$) alkylene or alkylenoxy groups as in alpha-phenyl propylene oxide:

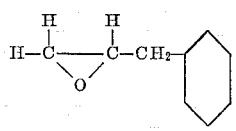

(IIIC)

or in phenyl glycidyl ether

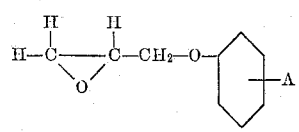

(IIID)

wherein A=H, but A may have the significance previously mentioned. In general, the starting material (b) is a compound which contains an epoxy group, reactive in Equation C, attached to groups or a group that is substantially inert to the reaction of Equation C as well as the epoxy resin per se. The group thus attached to the epoxy group of the material (b) preferably consists of no atoms other than C atoms, H atoms and O-ether linkages, and contains an aromatic nucleus.

A particularly distinguishing characteristic (and advantageous feature) of the adduct (IV) is that this compound contains at least one hydroxy group which is obtained upon reaction of the epoxy group, and such hydroxy group is believed to add materially to the compatibility of the Schiff's base (in the ultimate epoxy resin composition).

Still another starting material, sometimes referred to herein as (a), used in the practice of the invention is a carbonyl compound which is, first of all, an aldehyde or ketone which reacts with a primary amine group with elimination of water to form a Schiff's base (i.e. azomethine compound). Such a carbonyl compound (a) may have the following theoretical structural formula:

(X)

wherein $R_3$ and $R_4$ are each substantially inert to the Schiff's base formation reaction, in a manner similar to reaction (B). It will be appreciated that, in the cases where the molar ratio of (c):(b) is less than 1:1, then there may be formation of the following Schiff's base, at least to a limited extent:

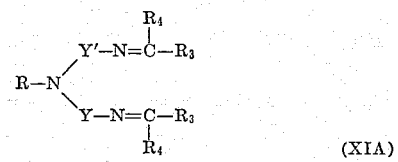

(XIA)

The carbonyl compound (X) is preferably a lower molecular weight ($C_2$–$C_6$) aldehyde or ketone, that is volatile so that an unreacted excess thereof may be easily removed by conventional distillation practices when the reaction of Equation C is completed. Also, it is often preferred to use a carbonyl compound (X) which boils at approximately the boiling point of water or somewhat below and forms a low boiling azeotrope or co-distills with the water.

Preferred examples of the carbonyl compound (X) include such volatile $C_2$–$C_6$ aldehydes and ketones as acetone, methyl ethyl ketone, diethyl ketone, methyl propyl ketone, methyl isopropyl ketone, methyl n-butyl ketone, methyl isobutyl ketone, methyl tert.-butyl ketone, ethyl isopropyl ketone, acetaldehyde, propionaldehyde, butyraldehyde, isobutyraldehyde, etc. (i.e. up to and including hexanone and hexanal).

EXAMPLE 3

In a two liter flask, there is placed a charge of 766 grams (2.00 mols) of bis-(aminopropyl) tall oil amine and 240 grams (2.00 mols) of redistilled styrene oxide. The mixture is heated with stirring at 80° C., and the base content is followed by titration with HBr in glacial acetic acid. After four hours, the base content becomes constant at 5.91 meq. per gram (calculated base content is 5.97 meq. per gram). The resulting adduct is a viscous liquid.

Using the procedure of the second paragraph of Example 1 hereinbefore described, 530 grams (7.35 mols) of freshly distilled methyl ethyl ketone is added to the adduct of the previous paragraph, and the mixture is distilled as previously described. The initial boiling point is about 76° C. at a kettle temperature of 83° C.; and after 250 milliliters of distillate have been collected, the vapor temperature is 83° C. and the kettle temperature is 102° C. The product is filtered and vacuum stripped at 80° C. (and 2 mm. Hg) giving a 98.3% yield of 1094 grams of the Schiff's base. Infrared analyses confirm the structure of the adduct of the previous paragraph as well as the Schiff's base obtained in the procedure of the instant paragraph.

Epoxy resin composition

Using the previously described epoxy resin GX190 in an amount of 60 grams with 40 grams of the Schiff's base described in the previous paragraph, it is found that compatibility and homogeneity are established by mixing for approximately six hours. Again, the time lag in mixing is substantially eliminated by the use of a small amount of solvent, such as about 6 grams of Cellosolve. The pot life obtained is less than a day, and after filming in accordance with the previously described procedure to obtain a 3 mil thick film, it is found that the tack-free time is less than a day also, and the resulting film is hard and fairly clear.

It should be noted that the results may be altered by varying the ratios of the ingredients (a), (b) and (c) used. For example, in the previous Example 3, if the mols of styrene oxide used in the first paragraph of this Example 3 are reduced from 2.00 to 1.5 mols, it is found that the resulting Schiff's base is not compatible with the epoxy resin in the absence of a solvent to aid in dispersion thereof. On the other hand, if the same procedure is carried out using 2.52 mols of styrene oxide, it is found that the resulting Schiff's base is compatible with the epoxy resin under the conditions described after approximately four hours of stirring, without the necessary for using any solvent to aid in dispersion thereof. Likewise, if the proportion of styrene oxide is incresed still more, to 2.92 mols of styrene oxide, it is found that the resulting Schiff's base is compatible with the epoxy resin is approximately 2 to 2½ hours of continuous stirring.

In each of these procedures, however, it is found that the resulting films cure to a tack-free condition in about one day to give tough, hard, glossy coatings having the desired superior properties of the instant invention.

EXAMPLE 4

A procedure is carried out that is the same as that of Example 1, except that the molar ratio of the aliphatic amine (c) to the styrene oxide (b) used is 1:1.25, and it is found that the resulting Schiff's base is compatible to the extent it forms a homogeneous mixture with the epoxy resin after about 2¼ hours of continuous stirring, and the resulting composition has a pot life of about one day and a tack-free time of somewhat more than one and substantially less than three days (in the case of a 3 mil film), although the resulting film cures to a clear, glossy, tough film having excellent hardness at the end of three days.

If the procedure is repeated using 1.5 mols of styrene oxide in place of the 1.25 mols used in the procedure of the previous paragraph, it is found that the resulting Schiff's base is compatible with the epoxy resin after about 15 minutes of stirring and the composition otherwise has the same properties as those described in the previous paragraph.

EXAMPLE 5

Using the procedure of the first paragraph of Example 1, a mixture is formed of a charge of 127.3 grams of bis-(aminopropyl) tall oil amine and 50 grams of phenyl glycidyl ether (i.e. about 0.33 mol of each) and the mixed charge is allowed to stand at ambient temperature for four days. Titration with HBr in acetic acid shows that the reaction has gone to completion at the end of this time, and that no epoxy compound remains.

Using the procedure described on the second paragraph of Example 1, a charge of 221 grams (2.21 mols) of redistilled methyl isobutyl ketone is added to a charge of 102 grams (0.192 mol) of the adduct obtained from the procedure of the previous paragraph, and the distillation was carried out as previously described. After 52 milliliters of the distillate are removed, including about 3.5 milliliters of water layer, the distillation is stopped and the residue is vacuum stripped at 80° C. (and 2 mm. Hg pressure); and the resulting product (100% yield) is a tan liquid weighing 118 grams.

The Schiff's base obtained in the procedure of the previous paragraph (i.e. 40 grams) is added to 60 grams of the previously described epoxy resin GX190 and after stirring continuously for about 20 hours the mixture becomes homogeneous. (Again, the time here indicated to achieve compatibility refers to the mixing in the absence of a solvent, which would materially reduce the time needed for compatibility.) The resulting composition is prepared in a 1½ mil thick film and found to have a tack-free time of less than two days and the resulting film when cured is clear and glossy having the excellent hardness that is typical of the films of the invention.

If a procedure is carried out that is the same as that described in this Example 5 except that the carbonyl compound used is methyl ethyl ketone, it is found that the resulting Schiff's base is compatible with the epoxy resin in approximately 1¼ hours (of continuous stirring), and a 3 mil film prepared therefrom is found to have a tack-free time of less than one day. The resulting cured film is clear and glossy and has reasonably good hardness at the end of the one day. The comparison here made is between the use of methyl ethyl ketone and methyl isobutyl ketone. It will be appreciated, however, that this comparison relates to the azomethine or Schiff's base compound, since the retention of even a relatively small amount of either of these ketones in the Schiff's base and, therefore, in the final epoxy resin composition will subtract to some extent from the clear glossy appearance of the final, cured, infusible resinous film. For example, if a 5% excess of free methyl ethyl ketone is added with the Schiff's base to the epoxy resin in the procedure of Example 1, it is found that the resulting film is not continuous and it does not possess the typical clear, glossy characteristic of the invention. This demonstrates a comparison between the use of small amounts of a relatively inert dispersing agent type of solvent such as Cellosolve as compared to the use of even a comparatively small amount of free ketone as an additional solvent in the practice of the invention. It will be appreciated that solvents ordinarily used in the practice of the instant invention are such that they will volatilize quite rapidly during the initial curing of the film or will remain substantially inert so that, in either case, they will not interfere with the continuity of the ultimately cured film.

An advantage of the use of volatile carbonyl compounds (a) in the practice of the instant invention is afforded by the ease with which these carbonyl compounds may be removed by conventional distillation practices so that the resulting Schiff's base does not contain any significant residual amount thereof in free form.

EXAMPLE 6

The procedure of the first paragraph of Example 3 is repeated, but using a molar ratio of 1:1.46 for the aliphatic amine (c) to the styrene oxide (b), and then the procedure of the second paragraph of Example 3 is carried out using methyl isobutyl ketone in place of the methyl ethyl ketone, and it is found that the resulting Schiff's base is compatible with the epoxy resin after about four hours continuous stirring, to obtain a composition having a pot life of less than one day which is prepared in a 3 mil film (found to have a tack-free time of less than one day), which cures to form a clear film having superior hardness after two days. It will thus be seen that in the case of Schiff's bases which are comparatively less compatible because of the use of a higher ketone such as methyl isobutyl ketone in the preparation thereof, it is possible to improve the compatibility by using greater relative molar proportions of the aromatic epoxy compound (b). Comparable results may thus be obtained in the practice of the invention by carrying out the procedure just described using various other carbonyl compounds (a) such as acetaldehyde, propionaldehyde, butyraldehyde and/or isobutyraldehyde. Also, comparable results are obtained using such other ketones as acetone, diethyl ketone, methyl propyl ketone or the like.

Any epoxy resin can be used in the present invention. Such resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is GX190, which is believed to be the reaction product of epichlorohydrin and 2,2-bis(p-hydroxyphenyl) propane (bisphenol A), the resin having the following theoretical structural formula:

Other types of epoxy resins which may be used in the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known

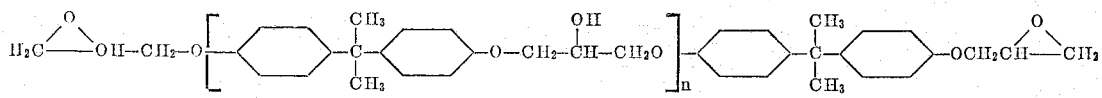

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

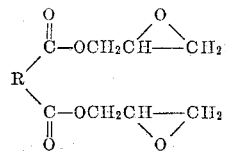

where R is the divalent hydrocarbon radical of dimerized unsaturated fatty acids.

The polymeric fat acids are well known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticia, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 8 to 22 carbon atoms. Illustrative thereof are oleic, linolenic, palmitoleic, and the like.

class of compounds readily obtained by condensing the appropriate dialdehyde with the desired phenol. Typical tetraphenols useful in the preparation of these epoxy resins are the alpha, alpha, omega, omega-tetrakis (hydroxyphenyl) alkanes, such as 1,1,2,2-tetrakis (hydroxyphenyl) ethane, 1,1,4,4-tetrakis (hydroxyphenyl) butane, 1,1,4,4-tetrakis (hydroxyphenyl)-2-ethylbutane and the like. The epoxy resin reaction product of epichlorohydrin and tetraphenol may be represented by the following theoretical structural formula:

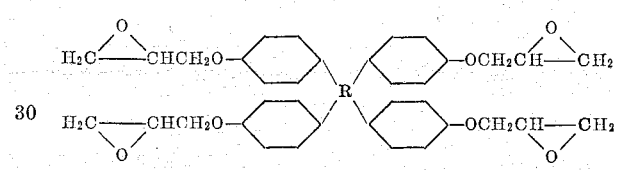

where R is a tetravelent aliphatic hydrocarbon chain having from 2 to 10, and preferably, from 2 to 6 carbon atoms.

Still another group of epoxide materials are the novolac epoxy resins. Such resins are well known substances and readily available commercially. The resins may be represented by the following theoretical, idealized formula:

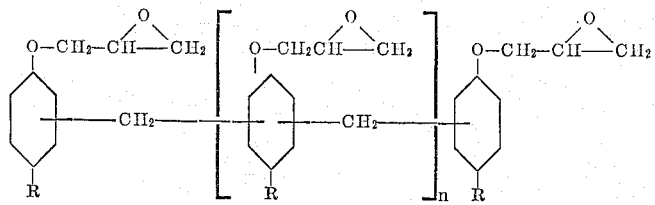

where R is selected from the group consisting of hydrogen and alkyl groups having up to 18 carbon atoms, and $n$ is an integer of from 1 to 5. In general, $n$ will be an integer in excess of 1 to about 3.

In general, these resins are obtained by reaction of epichlorohydrin with the well known novolac resins. The novolac resins, as is known in the art, are produced by condensing the phenol with an aldehyde in the presence of an acid catalyst. Although novolac resins from other aldehydes such as, for examples, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the paracarbon atom of the parent phenolic nucleus. However, novolac resins in which the alkyl group is in the ortho position have been prepared.

The novolac epoxy resin is formed in the well known manner by adding the novolac resins to the epichlorohydrin and then adding an alkali metal hydroxide to the mixture so as to effect the desired condensation reaction.

In addition, other epoxy resins which may be used to prepare the impregnated fibrous materials and laminates of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

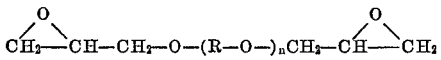

where R is an alkylene radical having from 2-5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent No. 2,923,695.

In general, the epoxy resins may be described as those having terminal epoxide groups (i.e., 1,2-epoxide groups), or at least as having more than one 1,2-epoxide group per molecule.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

We claim as our invention:

1. A composition whose hardenable components comprise a mixture of (1) a hardenable 1,2-epoxy resin having more than one 1,2-epoxy group per molecule and (2), as a latent curing agent therefor, a Schiff's base formed by reaction of (a) an azomethine group forming lower molecular weight organic carbonyl compound and an adduct of (c) 3 to 4 mols of an aliphatic amine having the formula:

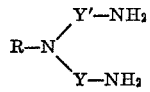

wherein R is an aliphatic $C_8$–$C_{22}$ fatty hydrocarbon chain and Y and Y' are each $C_3$–$C_4$ alkylene groups, with (b) 3 to 4 mols of a mono-1,2-epoxy compound.

2. A composition whose hardenable components comprise a mixture of (1) a hardenable 1,2-epoxy resin having more than one 1,2-epoxy group per molecule and (2) as a latent curing agent therefor, a Schiff's base formed by reaction of (a) a carbonyl compound whose molecule contains from two to six carbon atoms and an adduct of (c) 3 to 4 mols of an aliphatic amine having the formula:

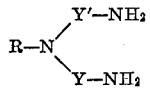

wherein R is an aliphatic $C_8$–$C_{22}$ fatty hydrocarbon chain and Y and Y' are each $C_3$–$C_4$ alkylene groups, with (b) 3 to 4 mols of an aromatic 1,2-epoxy compound, the molar ratio of (c):(a) plus (b) being substantially 1:2.

3. A coating composition consisting essentially of (1) a hardenable 1,2-epoxy reaction product of a polyfunctional halohydrin and a polyhydric phenol, having more than one 1,2-epoxy group per molecule and (2) a latent curing agent having the formula:

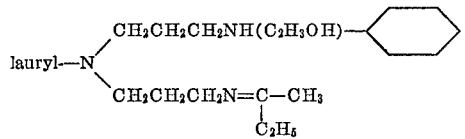

the weight ratio of (1):(2) ranging from substantially 7:3 to 1:3.

4. A coating composition consisting essentially of (1) a liquid hardenable 1,2-epoxy reaction product of a polyfunctional halohydrin and a polyhydric phenol having more than one 1,2-epoxy group per molecule and (2) a latent curing agent having the formula:

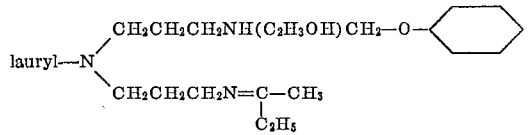

the weight ratio of (1):(2) ranging from substantially 7:3 to 1:3.

5. A process of producing a hardenable composition, which comprises intimately mixing (1) a hardenable liquid 1,2-epoxy resin having more than one 1,2-epoxy group per molecule and (2), as a latent curing agent therefor, a Schiff's base formed by reaction of (a) an azomethine group forming lower molecular weight organic carbonyl compound and an adduct of (c) 3 to 4 mols of an aliphatic amine having the formula:

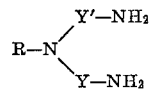

wherein R is an aliphatic $C_8$–$C_{22}$ fatty hydrocarbon chain and Y and Y' are each $C_3$–$C_4$ alkylene groups, with (b) 3 to 4 mols of a mono-1,2-epoxy compound.

6. A process of producing a hardenable composition, which comprises intimately mixing (1) a hardenable liquid 1,2-epoxy resin having more than one 1,2-epoxy group per molecule and (2), as a latent curing agent therefor, a Schiff's base formed by reaction of (a) a volatile carbonyl compound whos molecule contains from two to six carbon atoms and an adduct of (c) 3 to 4 mols of an aliphatic amine having the formula:

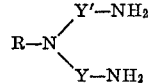

wherein R is an aliphatic $C_8$–$C_{22}$ fatty hydrocarbon chain and Y and Y' are each $C_3$–$C_4$ alkylene groups, with (b) 3 to 4 mols of an aromatic 1,2-epoxy compound, the molar ratio of (c):(a) plus (b) being substantially 1:2.

7. A process of producing a coating which comprises intimately admixing (1) a liquid hardenable 1,2-epoxy reaction product of a polyfunctional halohydrin and a polyhydric phenol having more than one 1,2-epoxy group per molecule and (2) a latent curing agent having the formula:

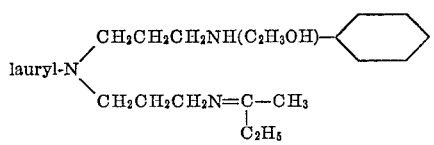

the weight ratio of (1):(2) ranging from substantially 7:3 to 1:3 and filming the resulting admixture.

8. A process of producing a coating which comprises intimately admixing (1) a liquid hardenable 1,2-epoxy reaction product of a polyfunctional halohydrin and a polyhydric phenol having more than one 1,2-epoxy group per molecule and (2) a latent curing agent having the formula:

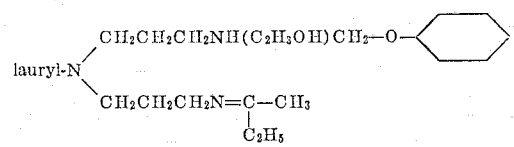

the weight ratio of (1):(2) ranging from substantially 7:3 to 1:3 and filming the resulting admixture.

9. An infusible insoluble resinous composition formed by curing in the presence of moisture a composition whose hardenable components comprise a mixture of (1) a hardenable 1,2-epoxy resin having more than one 1,2-epoxy group per molecule and (2), as a latent curing agent therefor, a Schiff's base formed by reaction of (a) an azomethine group forming lower molecular weight organic carbonyl compound and an adduct of (c) 3 to 4 mols of an aliphatic amine having the formula:

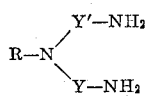

wherein R is an aliphatic $C_8$–$C_{22}$ fatty hydrocarbon chain and Y and Y′ are each $C_3$–$C_4$ alkylene groups, with (b) 3 to 4 mols of a mono-1,2-epoxy compound.

10. An infusible insoluble resinous composition formed by exposing to water a composition whose hardenable components comprise a mixture of (1) a hardenable 1,2-epoxy resin having more than one 1,2-epoxy group per molecule and (2), as a latent curing agent therefor, a Schiff's base formed by reaction of (a) a carbonyl compound whose molecule contains from two to six carbon atoms and an adduct of (c) 3 to 4 mols of an aliphatic amine having the formula:

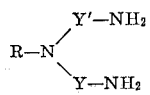

wherein R is an aliphatic $C_8$–$C_{22}$ fatty hydrocarbon chain and Y and Y′ are each $C_3$–$C_4$ alkylene groups, with (b) 3 to 4 mols of an aromatic 1,2-epoxy compound, the molar ratio of (c):(a) plus (b) being substantially 1:2.

11. An infusible insoluble resinous film formed by exposing to moist ambient atmosphere a film formed from a coating composition consisting essentially of (1) a hardenable 1,2-epoxy reaction product of a polyfunctional halohydrin and a polyhydric phenol having more than one 1,2-epoxy group per molecule and (2) a latent curing agent having the formula:

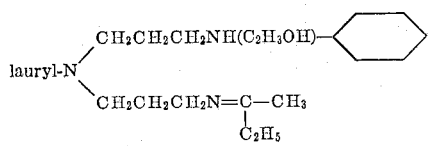

the weight ratio of (1):(2) ranging from substantially 7:3 to 1:3.

12. An infusible insoluble resinous film formed by exposing to moist ambient atmosphere a film formed from a coating composition consisting essentially of (1) a hardenable 1,2-epoxy reaction product of a polyfunctional halohydrin and a polyhydric phenol having more than one 1,2-epoxy group per molecule and (2) a latent curing agent having the formula:

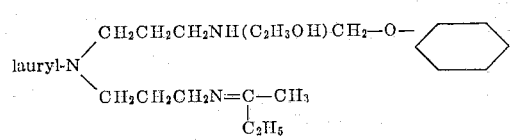

the weight ratio of (1):(2) ranging from substantially 7:3 to 1:3.

13. A method of producing an infusible insoluble resinous composition that comprises exposing to moisture a composition whose hardenable components comprise a mixture of (1) a hardenable 1,2-epoxy resin having more than one 1,2-epoxy group per molecule and (2), as a latent curing agent therefor, a Schiff's base formed by reaction of (a) an azomethine group forming lower molecular weight organic carbonyl compound and an adduct of (c) 3 to 4 mols of an aliphatic amine having the formula:

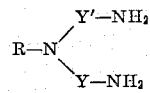

wherein R is an aliphatic $C_8$–$C_{22}$ fatty hydrocarbon chain and Y and Y′ are each $C_3$–$C_4$ alkylene groups, with (b) 3 to 4 mols of a mono-1,2-epoxy compound.

14. A method of producing an infusible insoluble resinous coating that comprises filming in the presence of moisture, a composition whose hardenable components comprise a mixture of (1) a hardenable 1,2-epoxy resin having more than one 1,2-epoxy group per molecule and (2), as a latent curing agent therefor, a Schiff's base formed by reaction of (a) a carbonyl compound whose molecule contains from two to six carbon atoms and an adduct of (c) 3 to 4 mols of an aliphatic amine having the formula:

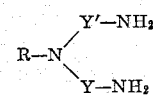

wherein R is an aliphatic $C_8$–$C_{22}$ fatty hydrocarbon chain and Y and Y′ are each $C_3$–$C_4$ alkylene groups, with (b) 3 to 4 mols of an aromatic 1,2-epoxy compound, the molar rotio of (c):(a) plus (b) being substantially 1:2.

15. A method of producing an infusible insoluble resinous film that comprises filming on a substrate, in the presence of moist ambient atmosphere a coating composition consisting essentially of (1) a hardenable 1,2-epoxy reaction product of a polyfunctional halohydrin and a polyhydric phenol having more than one 1,2-epoxy group per molecule and (2) a latent curing agent having the formula:

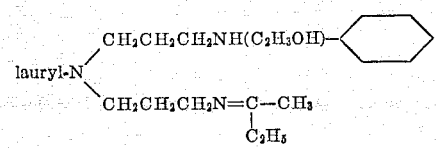

the weight ratio of (1):(2) ranging from substantially 7:3 to 1:3.

16. A method of producing an infusible insoluble resinous film that comprises filming on a substrate, in the presence of moist ambient atmosphere a coating composition consisting essentially of (1) a hardenable 1,2-epoxy reaction product of a polyfunctional halohydrin and a polyhydric phenol having more than one 1,2-epoxy group per molecule and (2) a latent curing agent having the formula:

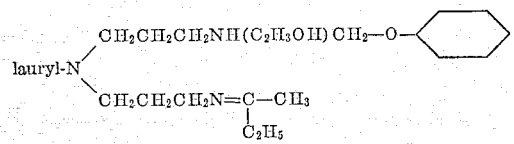

the weight ratio of (1):(2) ranging from substantially 7:3 to 1:3.

17. The composition of claim 2 wherein (1) is a bisphenol A-epichlorohydrin epoxy resin and the weight ratio of (1):(2) is substantially 7:3 to 1:3.

18. The composition of claim 3 wherein (1) is a bisphenol A-epichlorohydrin epoxy resin.

19. The process of claim 6 wherein (1) is a bisphenol A-epichlorohydrin epoxy resin and the weight ratio of (1):(2) is substantially 7:3 to 1:3.

20. The process of claim 7 wherein (1) is a bisphenol A-epichlorohydrin epoxy resin.

21. The composition of claim 10 wherein (1) is a bisphenol A-epichlorohydrin epoxy resin and the weight ratio of (1):(2) is substantially 7:3 to 1:3.

22. The composition of claim 12 wherein (1) is a bisphenol A-epichlorohydrin epoxy resin.

23. The method of claim 14 wherein (1) is a bisphenol A-epichlorohydrin epoxy resin and the weight ratio of (1):(2) is substantially 7:3 to 1:3.

24. The method of claim 16 wherein (1) is a bisphenol A-epichlorohydrin epoxy resin.

References Cited

UNITED STATES PATENTS 3,026,285  3/1962  Hirosawa _____ 260—72 XR
3,072,606  1/1963  Zuppinger et al.

OTHER REFERENCES

Lee et al.: "Epoxy Resins," McGraw-Hill Book Co., Inc.

WILLIAM H. SHORT, *Primary Examiner.*

T. D. KERWIN, *Assistant Examiner.*